United States Patent
Tokuno

[11] 4,224,847
[45] Sep. 30, 1980

[54] TOOL POSITIONING APPARATUS

[75] Inventor: Masateru Tokuno, Nishinomiya, Japan

[73] Assignee: Rengo Co., Ltd., Osaka, Japan

[21] Appl. No.: 950,833

[22] Filed: Oct. 12, 1978

[30] Foreign Application Priority Data

Oct. 20, 1977 [JP] Japan .............................. 52-126587
Feb. 16, 1978 [JP] Japan .............................. 53-17194
Aug. 19, 1978 [JP] Japan .............................. 53-101159

[51] Int. Cl.³ ........................................... B26D 1/24
[52] U.S. Cl. ........................................ 83/71; 83/479;
83/482; 83/499
[58] Field of Search ............. 83/499, 498, 504, 508.3,
83/482, 71, 479

[56] References Cited
U.S. PATENT DOCUMENTS

| | | | |
|---|---|---|---|
| 3,583,270 | 6/1971 | Webb | 83/499 X |
| 3,646,418 | 2/1972 | Sterns et al. | 83/549 X |
| 3,956,957 | 5/1976 | Corse | 83/482 |
| 4,033,217 | 7/1977 | Flaum et al. | 83/499 X |
| 4,095,511 | 6/1978 | Woolston | 83/499 X |

Primary Examiner—Frank T. Yost
Attorney, Agent, or Firm—Norris & Bateman

[57] ABSTRACT

A tool positioning apparatus which is adapted to position by numerical control a plurality of pairs of tools attached to a pair of parallel shafts so that longitudinal slits, scores or the like may be produced along a web of board such as corrugated board conveyed through between said pair of shafts is provided with a tool positioning apparatus, said apparatus comprising tool feed control devices which are provided correspondingly to the number of said pairs of tools and are movable respectively on a guide member disposed parallel to said shafts by driving motors which are numerically controlled by a positioning controller and which have shifters insertably engageable with pairs of tool holders corresponding thereto respectively on which said pairs of tools are fixed; and a moving device which enables said shifters to engage with and disengage from simultaneously said pairs of tool holders corresponding thereto respectively.

10 Claims, 11 Drawing Figures

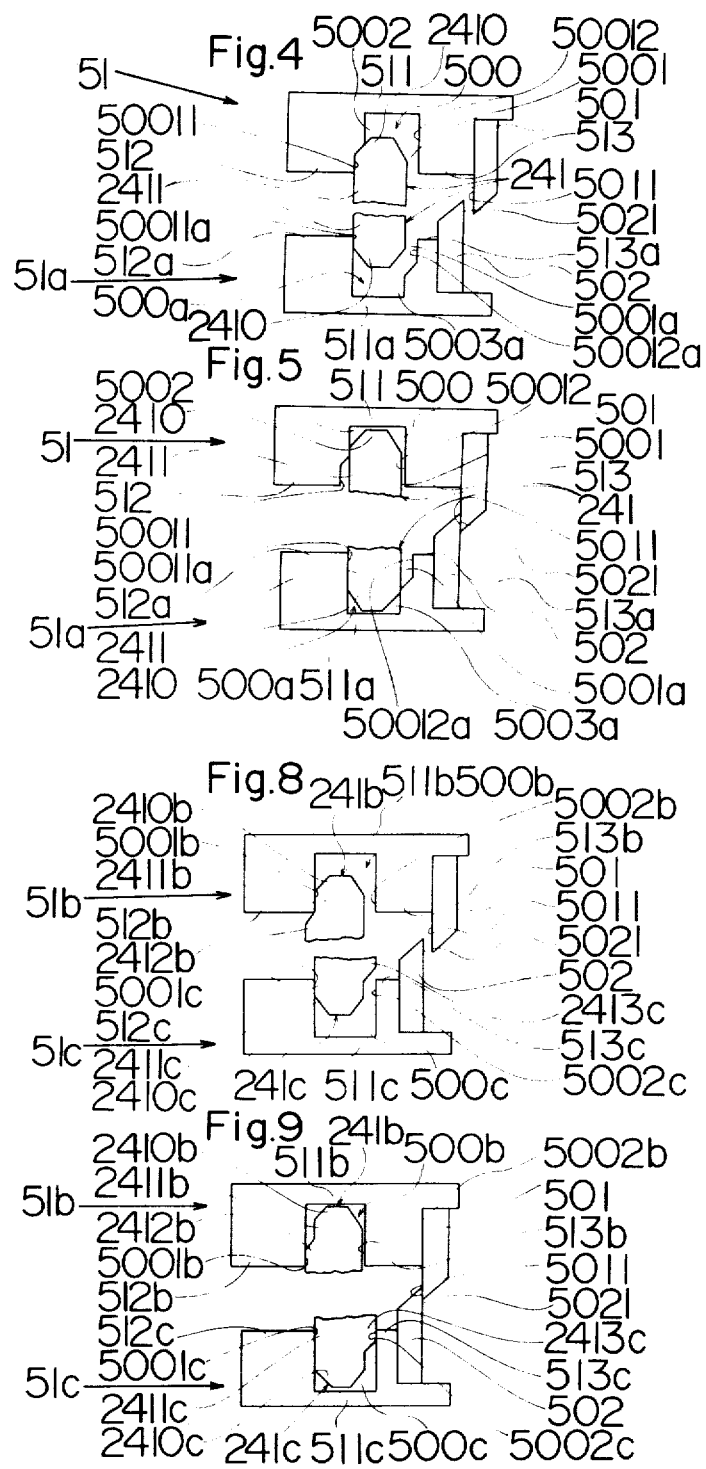

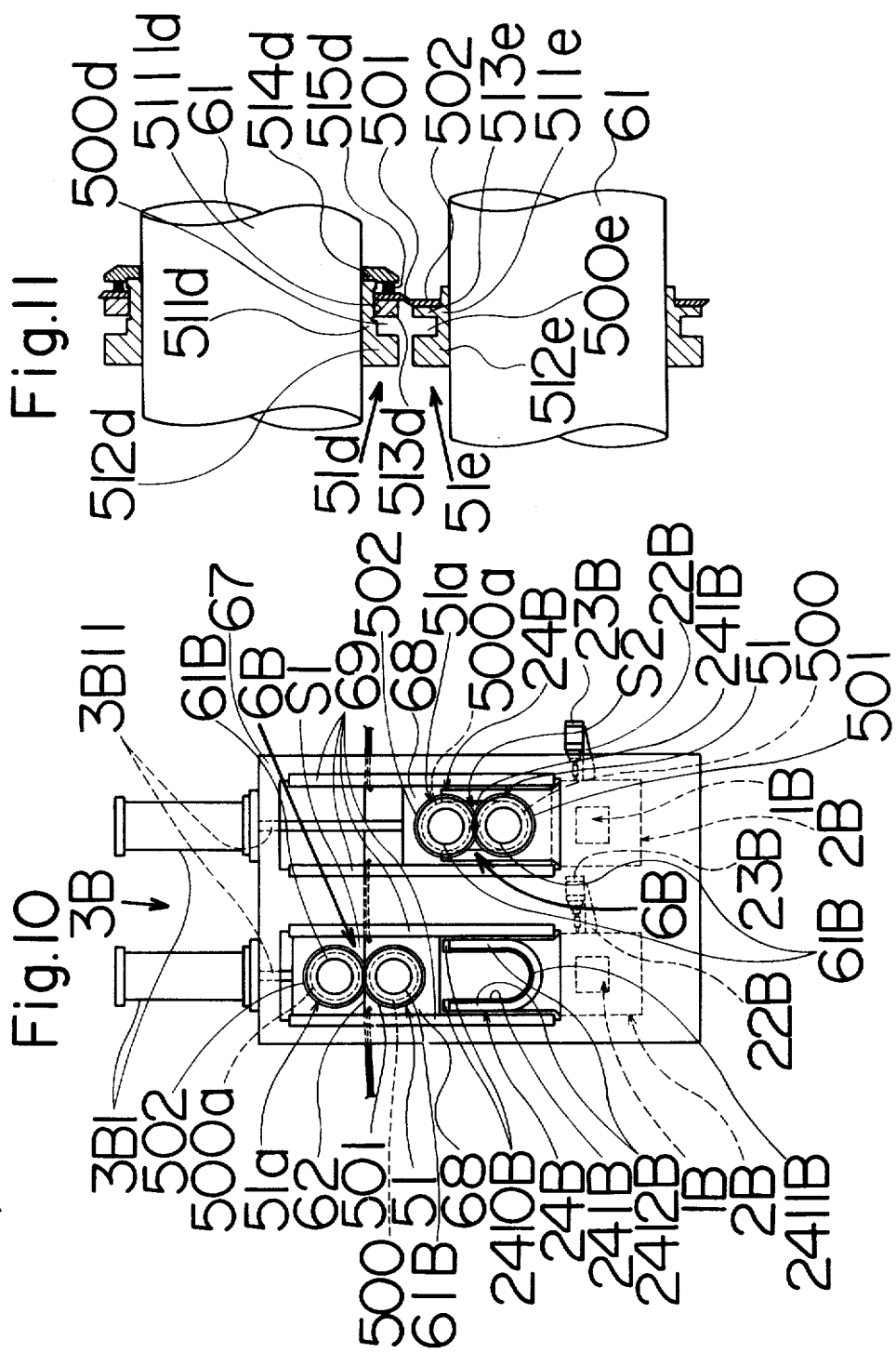

TOOL POSITIONING APPARATUS

The present invention relates to a tool positioning apparatus capable of positioning by numerical control a plurality of pairs of tools attached to a pair of parallel shafts respectively so that a web travelling continuously through between the shafts may be slit in the travelling direction.

Conventionally, in this kind of tool positioning apparatus, which has been used for positioning shiftable tools, such as slitting and scoring rolls of slitter-scorer apparatus, it has taken considerable time to position all the tools due to one-by-one leading of every pair of many tools by means of a common lead screw. Further the position of tools was determined indirectly by detecting a turning angle of the lead screw, so considerable errors occurred with regard to the accuracy of positioning due to plays which the lead screw and other machine parts have.

This kind of tool positioning device has tools attached to a pair of parallel shafts for slitting the webs, the slitting tools being in contact with each other at blades thereof, whereby when changing positions of the slitting tools on the shaft, either one of the two parallel shafts should be axially moved to make a gap between the both blades of the slitting tools to thereby protect them, and then they are axially moved along the shafts.

An object of the invention is to provide a tool positioning apparatus capable of simultaneously moving a large number of pairs of tools to be quickly positioned.

Another object of the invention is to provide a tool positioning apparatus which has a better accuracy of positioning owing to directly positioning tools.

A further object of the invention is to provide a tool positioning apparatus capable of changing the position of each pairs of tools without axially moving either one of the two parallel shafts carrying slitting tools, thereby simplifying the construction of device and saving an operation time to some extent.

A still further object of the invention is to provide a tool positioning apparatus suitable especially for a 2-bar type of a slitter-scorer apparatus having a pair of parallel shafts to which both pairs of slitting tools and pairs of scoring tools are attached and a 4-bar type of a slitter-scorer apparatus having two pairs of parallel shafts to which pairs of slitting tools or pairs of scoring tools are attached respectively.

These and other objects, features and advantages of the invention will become apparent from the following description of each embodiment of the 2-bar type of slitter-scorer apparatus in connection with the accompanying drawings, in which;

FIG. 4 and FIG. 5 are explanatory views showing the engagement of head grooves of a pair of tool holders with a pair of plate members of a shifter, used in the tool feed control device of the apparatus of FIG. 1;

FIG. 8 and FIG. 9 are explanatory views showing an appearance of the engagement of head grooves of a pair of tool holders with a pair of plate members of a shifter used in other embodiment of the tool positioning apparatus of the invention.

FIG. 10 is an explanatory schematic view of a slitter-apparatus utilizing a modified embodiment of the invention, and FIG. 11 is a section of another modified embodiment of head grooves of tool holders used in the tool positioning apparatus of the invention.

Figure 1:
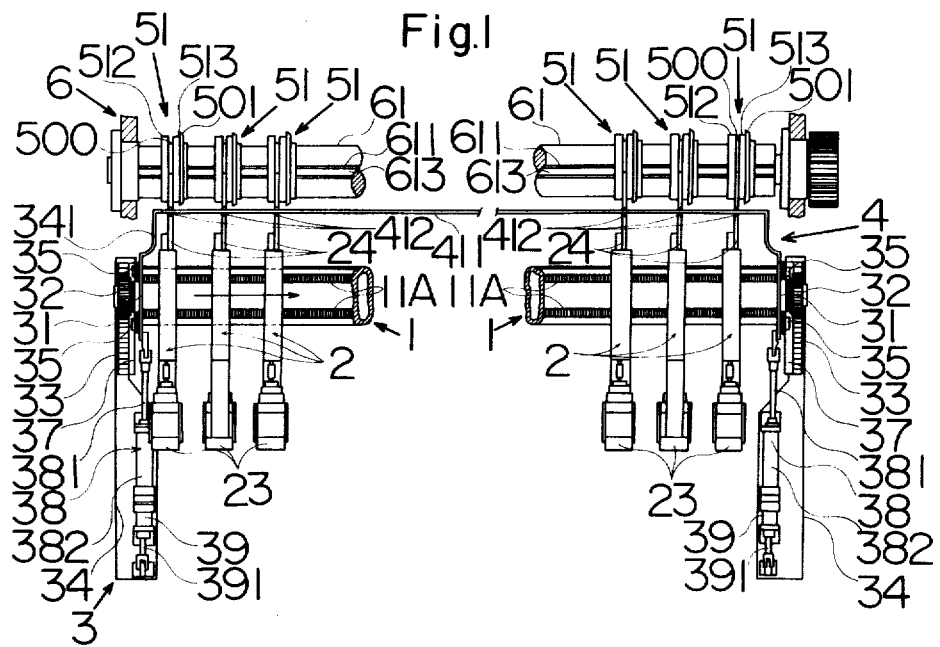
FIG. 1 is a plan view of an embodiment of the invention with certain parts omitted and cutaway.

An embodiment of the present invention will be discussed in the environment of a tool positioning apparatus for positioning six pairs of slitting tools (blades) 501 and 502, which are mounted on a pair of parallel shafts 61 2-bar type of a slitter apparatus 6 serving to slit a web 62 of corrugated board, which is continuously conveyed, in the running direction thereof.

The apparatus according to the present invention comprises a guide member 1, tool feed control devices 2 and a moving device 3, a numerical positioning controller 4 and pairs of tool holders 51 and 51a.

The guide member 1 is provided in parallel to a pair of the rotatable shafts 61 of the slitter apparatus 6 and holds two pairs of parallel racks 11A in parallel to the shafts 61 on its slide rails 11B at the upper and lower surfaces of the same respectively. The tool feed control devices 2 provided with shifters 24 are six corresponding to the number of the pairs of tools 501 and 502 and each of the tool feed control devices is provided with pinions 21 meshing with the racks 11A of the guide member 1 a frame 22 supporting therewith shafts 211 and 213 of the pinions 21 so as to be rotatable, and a motor 23 attached to the frame 22 for driving the shafts 211 and 213 of the pinions 21, the frame 22 surrounding the guide member 1.

One of two pinions 21 meshing with the pairs of racks 11A at the upper or the lower surface of the guide member 1 is fixed to the shaft 211 supported by the frame 22 through a bearing (not shown) of a bearing case 212 and the other is fixed to the shaft 213 supported by the frame 22 through a bearing (not shown) of a bearing case 214. The shafts 211 and 213 are connected through couplings 215 respectively, so that the two upper pinions 21 and the two lower pinions 21 are respectively meshed closely with the pairs of racks 11A corresponding thereto in relation of being mutually reversely turned.

Figure 3:
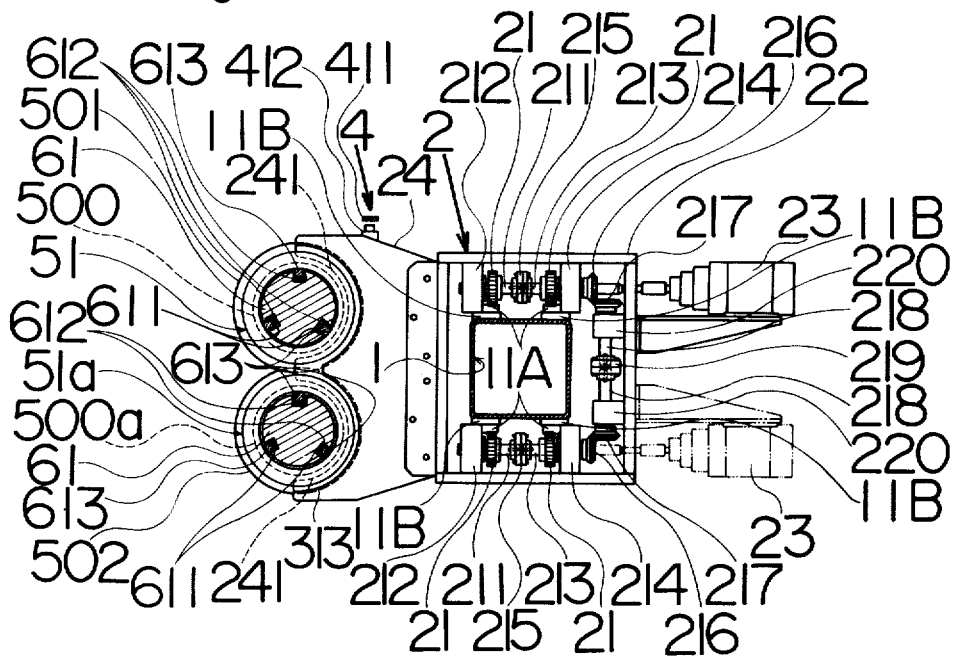
FIG. 3 is an explanatory view showing tool feed control devices and tool holders applied to the apparatus of FIG. 1.

Each bearing case 212 at both the upper and the lower surfaces is slidably in contact with the corresponding racks 11A and the slide rails 11B at the left side and serves as sliders for restricting the frame 22 from moving rightward and vertically in FIG. 3 and each bearing case 214 at both the upper and the lower surfaces is slidably in contact with the corresponding racks 11A and the slider rails 11B at the right side and serves as sliders for restricting the frame 22 from moving leftward and vertically in FIG. 3.

Each of the shafts 213 at the upper and the lower sides is provided with a bevel gear 216 fixed thereto, each gear 216 meshing with a bevel gear 217. Shafts 218 of the two bevel gears 217 are connected with each other through a coupling 219 so that the two bevel gears 217 are just meshed with the two those 216 respectively in the relation that the two bevel gears 217 are mutually reversely turned. The shafts 218 are supported by the frame 22 through bearings (not shown) of bearing cases 220 respectively. One of the motors 23 of the adjacent tool feed control devices 2 is, as shown by the solid line in FIG. 3, supported at the upper portion of the rear surface of the frame 22 and connected to the upper pinion shaft 213, and a motor 23 of the other device 2, as shown by the alternate long and two short dashes line in FIG. 3, is supported at the lower portion of the rear surface of the frame 22 and connected to the lower pinion shaft 213, so that two adjacent devices 2 may be arranged fully close to each other. Each of the tool feed control devices 2 is further provided with a shifter 24 supported at the front of the frame 22. The shifter 24 has, as shown in FIG. 4 and FIG. 5, a pair of plate members 241 which are engaged with a corresponding pair of tool holders 51 and 51a. Each plate member 241 has a tapering portion 2410 at the ends and a first plate portion 2411 which has a uniform width.

A tool holder 51 of the pair of tool holder 51 and 51a has a head portion 512 and a blade holder portion 513. They project respectively in a shape of a ring at both axial ends of a body portion 511 which is slidably mounted on the shaft 61. A blade 501 is fixed on the blade holder portion 513, and a head groove 500 is formed between the head portion 512 and the blade holder portion 513.

The head groove 500 provides a first groove portion 5001 and a second groove portion 5002. The first groove portion 5001 has a width which is at least equal to a sum of the width of the first plate portion 2411 and a width of a gap between the blade 501 and a blade 502 which is one of the pair. The second groove portion 5002 is formed in the depth of the first groove portion 5001, and has a width which is narrower than the width of the first groove portion 5001 by the width of the gap.

The other tool holders 51a of the pair of tool holder has a head portion 512a and a blade holder portion 513a. They project respectively in a shape of a ring at both axial ends of a body portion 511a which is slidably mounted on the shaft 61. The blade 502 is fixed on the blade holder portion 513a, and a head groove 500a is formed between the head portion 512a and the blade holder portion 513a.

The head groove 500a provides a first groove portion 5001a and a second groove portion 5003a. The first groove portion 5001a has a width which is equal to the width of the first groove portion 5001. The second groove portion 5003a is formed in the depth of the first groove portion 5001a and has a width which is equal to the width of the first plate portion 2411 of the plate member 241.

As shown in FIG. 4, the distance between a center-line of the first groove portion 5001 of the head groove 500 and a face 5011 of the blade 501 is longer than the distance between a center-line of the first groove portion 5001a of the head groove 500a and a face 5021 of the blade 502 by the width of the gap between the blade 501 and the blade 502.

As shown in FIG. 4 and FIG. 5, the second groove portion 5002 of the head groove 500 is formed so that the first plate portion 2411 of the plate member 241 begins to be inserted into it when the first groove portion 5001 of the head groove 500 faces the first groove portion 5001a of the head groove 500a, and then moves the head groove 500 to contact the blade 501 thereof with the blade 502.

And also, the second groove portion 5003a of the head groove 500a is formed so that the head groove 500a does not move by the plate portion 2411 of the plate member 241 inserted into the second groove portion 5002, when the first groove portion 5001 of the head groove 500 faces the first groove portion 5001a of the head groove 500a. So the blade 502 does not move.

The moving device 3 comprises plate members 31, fixed to both ends of the guide member 1, support means provided with pinions 32 rotatably mounted on the plate members 31 respectively, racks 33 extending rectangularly with respect to the longitudinal direction of the guide member 1 so as to be meshed with the pinions 32 respectively, frames 34 to which the racks are respectively fixed, two upper rollers 35 and one lower roller 36 rotatably mounted on each of the plate members 31 and rails 37 respectively fixed to the frames 34 in parallel to the racks 33 and arranged between the upper and the lower rollers 35 and 36 which are rotatably contactable, said support means permitting the plate members 31 to move forward; and means for moving the plate members 31 forward and backward, the means provided with piston cylinders 38 having piston rods 381 connected to the plate members 31 and piston cylinders 39 whose cylinder heads are connected with those of the piston cylinders 38 respectively and whose piston rods 391 are connected to the frames 34 so that the shifters 24 may be insertably engaged with the tool holders 51 and 51a, or disengaged therefrom by the movement of the shifters 24 together with the guide member 1 and tool feed control devices 2 with respect to the shafts 61.

Figure 2:
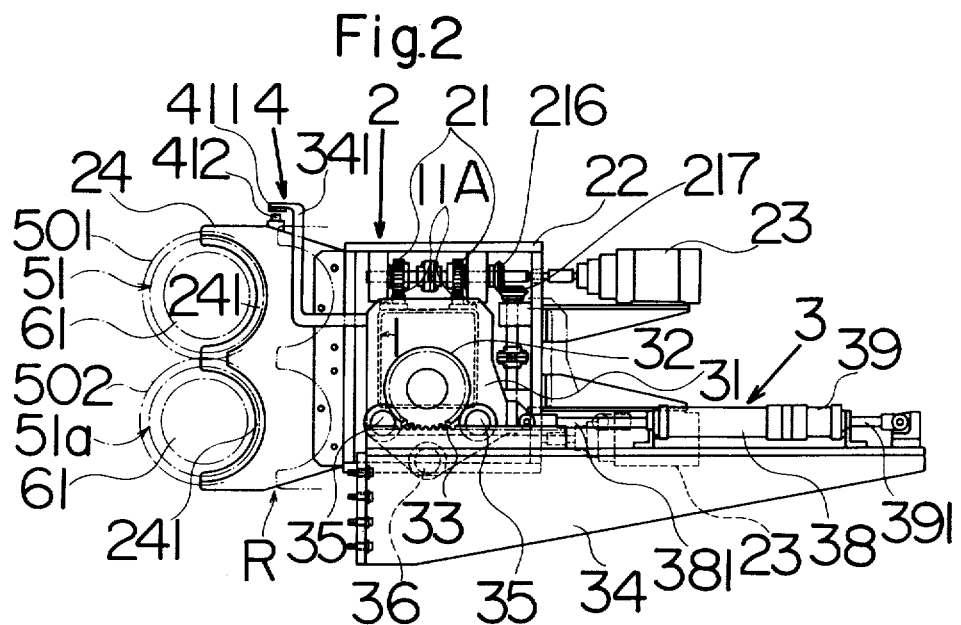
FIG. 2 is a side view of the apparatus of FIG. 1.
Figure 6:
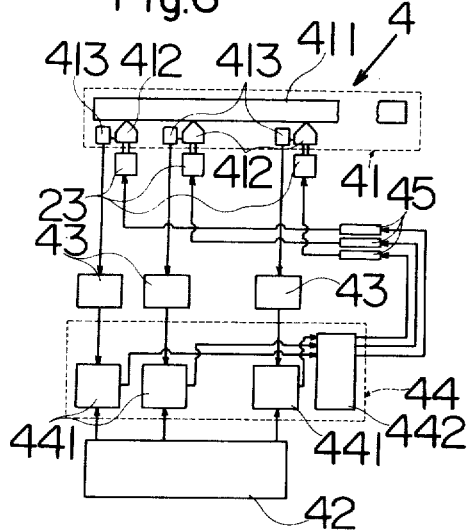
FIG. 6 is a block diagram of a typical numerical positioning controller for positioning used in the apparatus of FIG. 1.

An embodiment of the numerical positioning controller 4 is shown in FIG. 6. The controller 4 comprises a linear position detector 41, command circuit 42, counters 43, comparative control circuit 44 and driving motor control circuits 45. The linear position detector 41, as shown in FIG. 2, includes a straight scale 411 supported by arms 341 arranged on the plate members 31, parallel to the shafts 61 and magnetically calibrated; sensors (reading heads) 412 arranged at the upper portion of the shifters 24 of the tool feed control devices 2 as close as possible to the scale 411 and serving to detect the magnetic calibrations thereat to convert it into electric signals; and amplifiers 413 corresponding to each of the sensors 412 so as to amplify the electric signals therefrom. The counters 43 are provided correspondingly to the amplifiers 413 respectively to count and memorize the detected signals therefrom. The command circuit 42 reads a desired position (command value) of each tool from punched tape or cards, digital switch, memory or key board or the like, converts it into electric signal, and outputs the signal to each comparator 441 corresponding to respective tools. The comparators 441 and a control circuit 442 build up the comparative control circuit 44, the former receiving from the command circuit 42 the command value of the desired position of the corresponding tool and from the corresponding counter 43 the detected value of the actual position of the tool to thereby compare both the values to be computed, thus sending to the driving motor circuits 45 the command signal that the driving motor 23 of each tool feed control device 2, of which shifter 24 is engaged with the corresponding tool holders, is to be moved along the guide member 1 in the normal direction (shown by the arrow in FIG. 1) or in the reverse direction, or to what distance, or to be driven at high or low speed, or to be operated or stopped. The control circuit 442 calculates a distance between the adjacent tool feed control devices 2 by the output signal from each of the adjacent tool feed control devices 2, whereby when both the devices 2 approach within a given distance the command signal to stop or temporarily stop the motor(s) 23 of one or both of the tool feed control devices 2 is sent from the circuit 442 to the driving motor control circuit(s) 45 to be hereinafter described, for the motor(s) 23 of the corresponding tool feed control device(s). The driving motor control circuit 45 is provided correspondingly to the motor 23 of each tool feed control device 2 so as to control by the control signal from the comparative control circuit 44 the corresponding motor 23 to be rotated normally or reversely, at high or low speed, or to be stopped.

Operation of the apparatus according to the present invention is described below.

Figure 7:
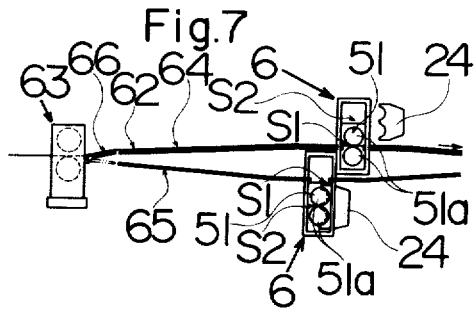
FIG. 7 is a view illustrating function of a slitter apparatus utilizing the apparatus of FIG. 1.

The slitter apparatus 6 are, as shown in FIG. 7, arranged at the upper and lower passages 64 and 65 respectively which are arranged at the rear of a rotary shear 63 for cutting a web 62 of corrugated board rectangularly to the running direction thereof. Between the shear 63 and both the passages 64 and 65 is provided guide means 66 for guiding the cut web 62 to the passage 64 or 65. The tools 501 and 502 of the apparatus 6 reciprocate vertically between the position S1 where the web 62 is slit and the position S2 where the tools are positioned. The tools 501 and 502 of the apparatus 6 at the position S2 are reset on the shafts 61 in such a manner that each of the tool holders 51 and 51a is released from the fixation to the shaft 61 owing to the operation described hereinafter, that the piston rods 381 of the piston cylinders 38 of the moving device 3 are projected to allow the guide member 1 to approach the shafts 61 in parallel, and then have the first plate portion 2411 of the plate member 241 of each of the shifters 24 waiting at the positions corresponding to those of the head grooves 500 and 500a of the tool holders inserted simultaneously into the first groove portion 5001 of the head groove 500 and the first groove portion 5001a of the head groove 500a of each of the tool holders, and that punched tape or card bearing the desired position of each pair of tools is read by command circuit 42. Hence, regarding the position of each pair of tools on the shafts 61, the command value of each desired position from the circuit 42 and the detection value of each actual position from the counter 43 are always compared to be controlled by the comparative control circuit 44 so that command signal is given to each of the driving motor control circuits 45 to move the motor 23 in a desired distance, and to rotate normally or reversely, or at high speed or low speed, or stop the same, thus allowing each of the tool feed control device 2 carrying the corresponding tool holders inserted onto the shifter 24 to run by itself on the guide member 1 and stop at the desired position.

When the first plate portions 2411 of a pair of the plate members 241 are inserted into the first groove portion 5001 of the head groove 500 and the first groove portion 5001a of the head groove 500a at the first engagement between the pair of tool holders 51 and 51a and the plate members of the shifter 24, the pair of tools 51 is moved on a pair of the parallel shafts 61, the first plate portions 2411 touch both a side face 50011 of the first groove portion 5001 and a side face 50011a of the first groove portion 5001a or both a side face 50012 of the first groove portion 5001 and a side face 50012a of the first groove portion 5001a. Accordingly and sequently, the blade 501 leaves the blade 502 or the blade 502 leaves the blade 501 and a gap is formed between the two blades.

After the stop of each of the tool feed control devices 2 the shifters 24 further function as follows:

Sequently, the piston rods 391 of piston cylinders 39 of the moving device 3 are projected to move the first plate portions 2411 of the shifters 24 forward so that the first plate portion 2411 of each plate member 241 may be inserted into the second groove portion 5002 of the head groove 500 and the second groove portion 5003a of the head groove 500a. Accordingly, the blade 501 approaches the blade 502 or the blade 502 approaches the blade 501, and sequently the two blades come in contact. Thereafter, tubes 612 within the recesses 611 at the shaft 61 are, as shown in FIG. 3, expanded by the fluid pressure to project engaging members 613 from the outer peripheries of the shafts 61 respectively, thereby fixing the tool holders 51 and 51a thereto. Then, the piston rods 381 of the piston cylinders 38 and the piston rods 391 of the piston cylinders 39 are retracted, whereby the shifters 24 together with the guide member 1 are moved backward to the stand-by position R, shown in FIG. 2, to release simultaneously the plate members 241 from the grooves 500 and 500a and thereafter the slitter apparatus 6 travels to the position S1 from that S2.

Another embodiment of the head grooves of a pair of the tool holders and the plate members of the shifter of the present invention is shown in FIG. 8 and FIG. 9.

The shifter comprises the pair of plate members which are provided in a body.

A plate member 241b which is one of the pair of plate members of the shifter 24 comprises a tapering portion 2410b, a first plate portion 2411b and a second plate portion 2412b. The width of the second plate portion 2412b is equal to a sum of the width of the first plate portion 2411b and a width of a gap between a blade 501 and a blade 502. The second plate portion 2412b is made wider on the left side. On the other hand, the other plate member 241C comprises a tapering portion 2410c, a first plate portion 2411c and a second plate portion 2413c. The width of the first plate portion 2411c is equal to that of said first plate portion 2411b, and the width of the second plate portion 2413c is at least equal to a sum of the width of the second plate portion 2412b and the width of said gap. The second plate portion 2413c is made wider on the right side. The plate members 241b and 241c are united.

A tool holder 51b which is one of the pair of tool holder 51b and 51c has a head portion 512b and a blade holder portion 513b. They project respectively in a shape of ring at both axial ends of a body portion 511b which is slidably mounted on the shaft 61. On the blade holder portion 513b, the blade 501 is fixed. The head groove 500b is formed between the head portion 512b and the blade holder portion 513b. The width of groove of the head groove 500b is enough to be inserted by the second plate portion 2412b of the plate member 241b.

The other tool holder 51c of a pair of said tool holders has a head portion 512c and a blade holder portion 513c. They project respectively in a shape of a ring at both axial ends of a body portion 511c which is slidably mounted on the shaft 61. On the blade holder portion 513c, the blade 502 is fixed. A head groove 500c is formed between the head portion 512c and the blade holder portion 513c.

The width of groove of the head groove 500c is equal to that of the second plate portion 2413c of the plate member 241c.

The distance between a center line of the head groove 500b and a face 5011 of the blade 501 is longer than the distance between a centerline of the head groove 500c and a face 5021 of the blade 502 by the gap between the blade 501 and the blade 502.

Accordingly, when the first plate portion 2411b of the plate member 241b and the first plate portion 2411c of the plate member 241c are inserted into the head groove 500b of the tool holder 51b and the head groove 500c of the tool holder 51c respectively at the first engagement, and when the pair of tool holders is moved on a pair of the parallel shafts 61, the first plate portion 2411b of the plate member 241b touches a side face 5001b of the head groove 500b and at the same time the first plate portion 2411c of the plate member 241c touches a side face 5001c of the head groove 500c. On another case, the first plate portion 2411b of the plate member 241b touches a side face 5002b of the head groove 500b and simultaneously the first plate portion 2411c of the plate member 241c touches a side face 5002c of the head groove 500c.

Consequently, the blade 501 leaves the blade 502 or the blade 502 leaves the blade 501, and a gap is formed between the both blades.

When the shifter 24 is projected after the movement of a pair of the tool holders 51b and 51c on the pair of parallel shafts 61, the second plate portion 2412b of the plate member 241b and the second plate portion 2413c of the plate member 241c are inserted sequently into the head groove 500b and the head groove 500c respectively. Consequently, the blade 501 approaches the blade 502 or the blade 502 approaches the blade 501, and the both blades come in contact with each other.

A modified embodiment of the present invention is shown in FIG. 10 in the environment of a tool positioning apparatus for slitting tool 501 and 502 attached to a pair of parallel shafts 61B of the slitter apparatus 6B for slitting a web 62 of the corrugated board, which continuously conveyed, in the running direction thereof. The apparatus 6B according to this embodiment comprises a guide member 1B which has the same construction as that of the former embodiment and is fixed to the frames 67 in parallel to a pair of rotatable shafts 61B of the apparatus 6B. The tool feed control devices 2B which have the same constructions as those of the tool feed control devices 2 of the former embodiment except the mounting positions of the shifters and the driving motor and the shapes of the plate members provided as many as the number of the tools 501 and 502. Each of the tool feed control devices 2B is adapted to run by itself on the guide member 1B by means of a driving motor 23B attached to a frame 22B of each of the tool feed control devices 2B and has shifters 24B mounted on the upper portion of the frame 22B respectively. Each of the shifters 24B has a plate member 241B. Said plate members 241B are insertably engageable with the head grooves 500 and 500a of the tool holders 51 and 51a corresponding to the shifters 24B respectively. Top end portions 2410B and an U-shaped edge portion 2411B of the plate member 241B are tapered to the end. An U-shaped plate portion 2412B of the plate member 241B has an uniform width. The width is equal to the width of the first plate portion 2411 of the plate member 241.

A moving device 3B is provided with a pair of opposite plates 68 rotatably supporting therewith both ends of the pairs of shafts 61B, support frames 69 attached to the lateral sides of a frame 67 for supporting the plates 54 with permitting the vertical reciprocation thereof through the frame 67, and a piston cylinder 3B1 provided at the upper portion of the frame 67 and having piston rod 3B11 connected to the plate 68 so that plates 68 may be raised or lowered along the support frames 69.

The moving device 3B in this embodiment also serves to vertically reciprocate the apparatus 6B between the position S1 for slitting the web 62 and the position S2 for positioning each tool. The positioning of the tools 501 and 502 on the shafts 61B of the apparatus 6B which is on the position S2 is performed in such a manner that each of the tool holders 51 and 51a is released from the fixation on the shafts 61 and the piston rod 3B11 of the piston cylinder 3B1 of the moving device 3B is projected to take down the shafts 61 and have the plate member 241B of each shifter 24B waiting at the positions corresponding to the head grooves 500 and 500a of each pair of the tool holders inserted simultaneously into the first groove portion 5001 of the head groove 500 and the first groove portion 5001a of the head groove 500a, and then the same operation as the former embodiment allows each of the tool feed control devices 2B to run by itself on the guide member 1B to the desired position and stop thereat. Then, the piston rod 3B11 is further projected to lower the shafts 61B, whereby the second groove portion 5002 of the head groove 500 and the second groove portion 5002a of the head groove 500a of the tool holders are inserted simultaneously with the plate member 241B of each shifter 24B. Thereafter, the tool holders 51 and 51a are fixed to the shafts 61B similarly to the former embodiment, and the piston rod 3B11 of the piston cylinder 3B1 is then retracted so that the plate members 241B are disengaged simultaneously from the head grooves 500 and 500a of the tool holders, and the pair of shafts 61B are raised to the position S1.

A further embodiment of the head grooves of the tool holders is shown in FIG. 11. A tool holder 51d of a pair of tool holders 51d and 51e has a body portion 511d, a head portion 512d and a receiver portion 514d. The body portion 511d is slidably mounted on the shaft 61, and the head portion 512d projects in a shape of a ring at an axial end of the body portion 511d. The receiver portion 514d is fixed by screws (not shown) at the other axial end of the body portion 511d.

A shallow groove 5111d is formed between the head portion 512d and the receiver portion 514d. A blade holder 513d is slidably mounted on the shallow groove 5111d, that is, on the body portion 511d. As a key (not shown) is provided on the body portion 511d, the blade holder 513d is prevented from moving circumferentially. A blade 501 is fixed on the blade holder 513d.

Compresible springs 515d of a elastic material are provided between the blade holder 513d and the receiver portion 514d, and a head groove 500d is formed between the head portion 512d and the blade holder 513d.

The width of the head groove 500d is equal to a balance of the width of the first plate portion 2411 of the plate member 241 and the gap between the blade 501 and blade 502.

The other tool holder 51e of a pair of said tool holders has a head portion 512e and a blade receiver portion 513e. They are projected in a shape of a ring at both axial ends of a body portion 511e which is mounted slidably on the shaft 61. The blade 502 is fixed on the blade receiver portion 513e. A head groove 500e is formed between the head portion 512e and the blade receiver portion 513e. The width of the head groove 500e is equal to the width of the first plate portion 2411 of the plate member 241.

Accordingly, when the pair of plate members 241 of each shifter 24 are inserted into the head grooves 500d and 500e of the corresponding pair of tool holders 51d and 51e, the plate members 241 inserted into the head groove 500d urges the blade holder 513d toward the receiver portion 514d against the compresible springs 515d. Hence, the blade 501 fixed on the blade holder 513d is moved slightly apart from the blade 502, whereby a gap is produced between both the blades 501 and 502. As a result, the blades are protected even when the pair of tool holders 51d and 51e are released from the fixation to the shafts 61 and moved thereon.

On the other hand, when the plate members 241 are disengaging from both the head grooves 500d and 500e after the pair of tool holders 51d and 51e is fixed at the desired positions on the shafts 61, the compresible springs 515d return the blade holder 513d to the initial position, whereby the blade 501 fixed on the blade holder 513d is pushed against the blade 502, thus keeping both the blades 501 and 502 in contact with each other.

In the embodiments of the apparatus of the present invention as described hereinbefore, the head grooves 500 and 500a of the tool holders 51 and 51a are engaged with the plate members 241 and 241a of the shifter 24, and the head grooves 500b and 500c of the tool holders 51b and 51c are engaged with the plate members 241b and 241c of the shifter 24. The both engagements are carried out respectively by two operations which are a first engagement and a consecutive second engagement. When the first engagement is carried out and then one of the pair of the tool holders 51 and 51a or the tool holders 51b and 51c is axially moved on the shafts 61, the gap is made between the blade 501 and the blade 502, and when the second engagement is carried out, the both blades come in contact with each other.

However, in this embodiment the only once engagement is carried out by one operation. The gap between the both blades is formed by the engagement, and the both blades come in contact with each other by the disengagement. At this point the embodiment is very different from the other embodiments.

In this embodiment, the object of the invention is achieved by using a tool holder having the same structure as that of the tool holder 51d in the place of the tool holder 51e or such a elastic material as a rubber or the like in the place of the springs 515d. And it also is achieved by using the plate member, the width of which is wider than that of the head groove by the width of the gap between the both blades, in case the width of the head groove 500d is decided optionally.

What is claimed is:

1. A tool positioning apparatus which is adapted to position by a numerical control a plurality of pairs of tools attached to pairs of tool holders mounted on a pair of parallel shafts so that longitudinal slits, scores or the like may be produced along a web of board such as corrugated board conveyed through between said pair of shafts, said tool positioning apparatus being provided with; pairs of tool holders slidably mounted on said pair of parallel shafts and adapted to attach said pairs of tools respectively; shifters arranged at tool feed control devices which are provided correspondingly to the number of said pairs of tools and movable on at least one guide member parallel to said shafts, and being adapted to engage and disengage with said pairs of tool holders respectively; a moving device capable of engaging simultaneously all of said shifters with said pairs of tool holders respectively and disengaging simultaneously all said shifters from said pairs of tool holders respectively, each pair of said pairs of tool holders having a pair of head grooves adapted to coact with a shifter to form a gap between said pair of tools when first engaged with a shifter and then moved on said shafts, and also to allow said pair of tools to contact with each other when secondly engaged with said shifter; and a numerical positioning controller capable of controlling driving motors of said tool feed control devices.

2. The tool positioning apparatus as claimed in claim 1, wherein said numerical positioning controller is provided with a linear position detector comprising a straight scale arranged in parallel to said pair of parallel shafts and sensors are mounted on each of said tool feed control devices.

3. The tool positioning apparatus as claimed in claim 1, wherein said moving device has a means which has said guide member approached to or parted from said pair of shafts in parallel.

4. The tool positioning apparatus as claimed in claim 1, wherein said moving device has a means which has said pair of parallel shafts approached to or parted from said guide member in parallel.

5. A tool positioning apparatus which is adapted to position by a numerical control a plurality of pairs of tools attached to pairs of tool holders mounted on a pair of parallel shafts so that longitudinal slits, scores or the like may be produced along a web of board such as corrugated board conveyed through between said pair of shafts, said tool positioning apparatus being provided with; pairs of tool holders slidably mounted on said pair of parallel shafts and adapted to attach said pairs of tools respectively; shifters arranged at tool feed control devices which are provided correspondingly to the number of said pairs of tools and movable on at least one guide member parallel to said shafts, and being adapted to engage and disengage with said pairs of tool holders respectively; a moving device capable of engaging simultaneously all of said shifters with said pairs of tool holders respectively and disengaging simultaneously all said shifters from said pairs of tool holders respectively, each of said shifters having a pair of plate members adapted to coact with said tool holders to form a gap between each said pair of tools when first engaged with said pair of tool holders and then moved on said shafts, and also to allow said pair of tools to contact with each other when secondly engaged with said pair of tool holders; and a numerical positioning controller capable of controlling driving motors of said tool feed control devices.

6. A tool positioning apparatus which is adapted to position by a numerical control a plurality of pairs of tools attached to pairs of tool holders mounted on a pair of parallel shafts so that longitudinal slits, scores or the like may be produced along a web of board such as corrugated board conveyed through between said pair of shafts, said tool positioning apparatus being provided with; pairs of tool holders slidably mounted on said pair of parallel shafts and adapted to attach said pairs of tools respectively; shifters being arranged at tool feed control devices which are provided correspondingly to the number of said pairs of tools and movable on at least one guide member parallel to said shafts, and being adapted to engage and disengage with said pairs of tool holders respectively; a moving device capable of engaging simultaneously all said shifters with said pairs of tool holders respectively and disengaging simultaneously all said shifters from said pairs of tool holders respectively, one of both of each pair of said pairs of tool holders having a head groove which is adapted to coact with a shifter to form a gap between said pair of tools when engaged with a shifter and allow said pair of tools to contact with each other when disengaged from said shifter; and a numerical positioning controller capable of controlling driving motors of said tool feed control devices.

7. A tool positioning apparatus which is adapted to position by a numerical control a plurality of pairs of tools attached to pairs of tool holders mounted on a pair of parallel shafts so that longitudinal slits, scores or the like may be produced along a web of board such as corrugated board conveyed through between said pair of shafts, said tool positioning apparatus being provided with; pairs of tool holders slidably mounted on said pair of parallel shafts and adapted to attach said pairs of tools respectively; shifters being arranged at tool feed control devices which are provided correspondingly to the number of said pairs of tools and movable on at least one guide member in parallel to said shafts, and being adapted to engage and disengage with said pairs of tool holders respectively; a moving device capable of engaging simultaneously all said shifters with said pairs of tool holders respectively and disengaging simultaneously all said shifters from said pairs of tool holders respectively, each of said shifters having a pair of plate members which are adapted to coact with said tool holders form a gap between said pair of tools when engaged with said pair of tool holders and allow said pair of tools to contact with each other when disengaged from said pair of tool holders; and a numerical positioning controller capable of controlling driving motors of said tool feed control devices.

8. In apparatus for producing longitudinal slits, scores or the like on a moving web of board such as corrugated board, a pair of rotatable shafts mounted one above the other, a plurality of coacting pairs of tools assemblies spaced along said shafts, each pair of tool assemblies comprising a tool holder on one shaft associated with a tool holder on the other shaft, each tool holder being adapted to be released for slidable movement along its shaft, and each pair of tool holders carrying a tool element that is in operative contact with a tool element on the other when performing the slitting, scoring or like operation, a plurality of shifters one for each pair of tool assemblies, means for independently moving said shifters in a direction parallel to said shafts for selectively locating said tool assemblies at desired laterally spaced locations relative to the web, means for moving all of said shifters simultaneously toward and from said tool assemblies, and means on each shifter coacting with means on the tool holders whereby one selective movement of that shifter engages said shifter with both tool holders of one of said pairs of tool assemblies to shift said tool holders axially to relatively separate said tool elements, and further selected movement of that shifter moves said tool holders axially to contact said tool elements.

9. In the apparatus defined in claim 8, each said shifter comprising a plate that engages in groove means of said tool holders for effecting said separation of said tool elements and for moving them back into operative contact.

10. In the apparatus defined in claim 8, a guide extending parallel to said shafts, each of said shifters comprising a frame mounted for selective movement along said guide, and means for selectively moving said guide toward and away from said shafts to engage and disengage all of said shifters with respect to said tool holders.

* * * * *